Aug 5, 1941.     F. W. SCHWINN     2,251,639
BICYCLE STAND
Filed March 4, 1939     2 Sheets-Sheet 1
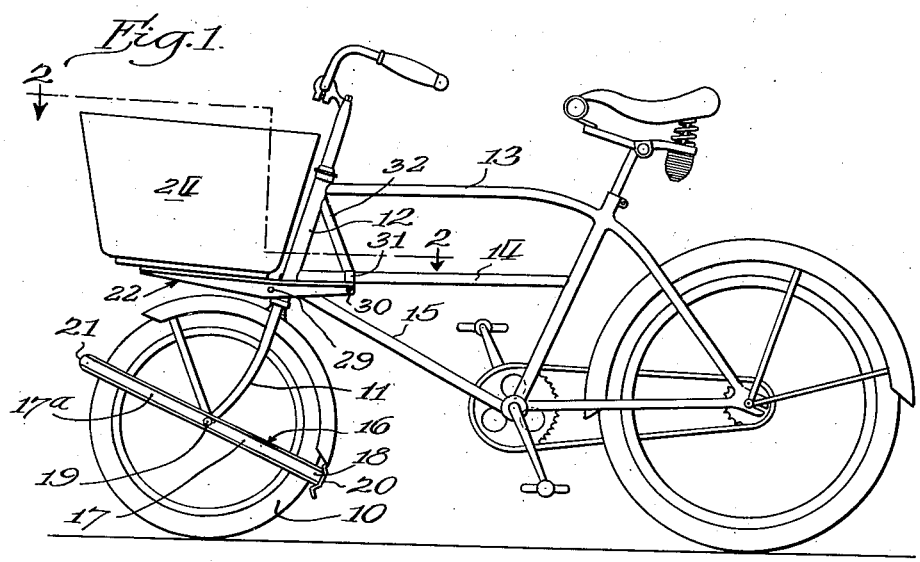
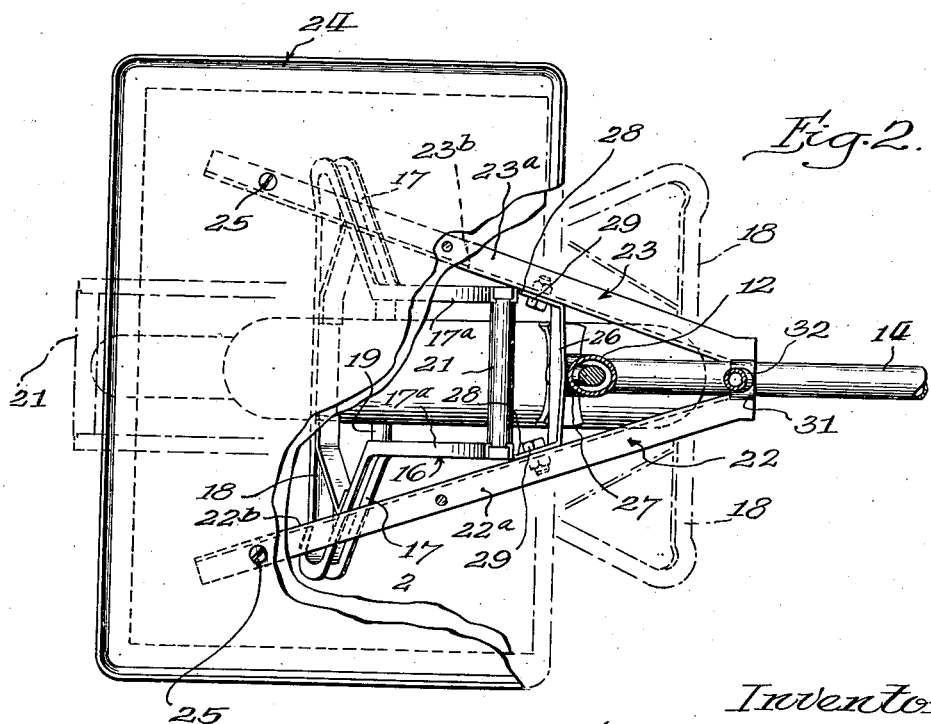
Inventor:
Frank W. Schwinn
By Williams, Bradbury, McCaleb & Hinkle
Attys.

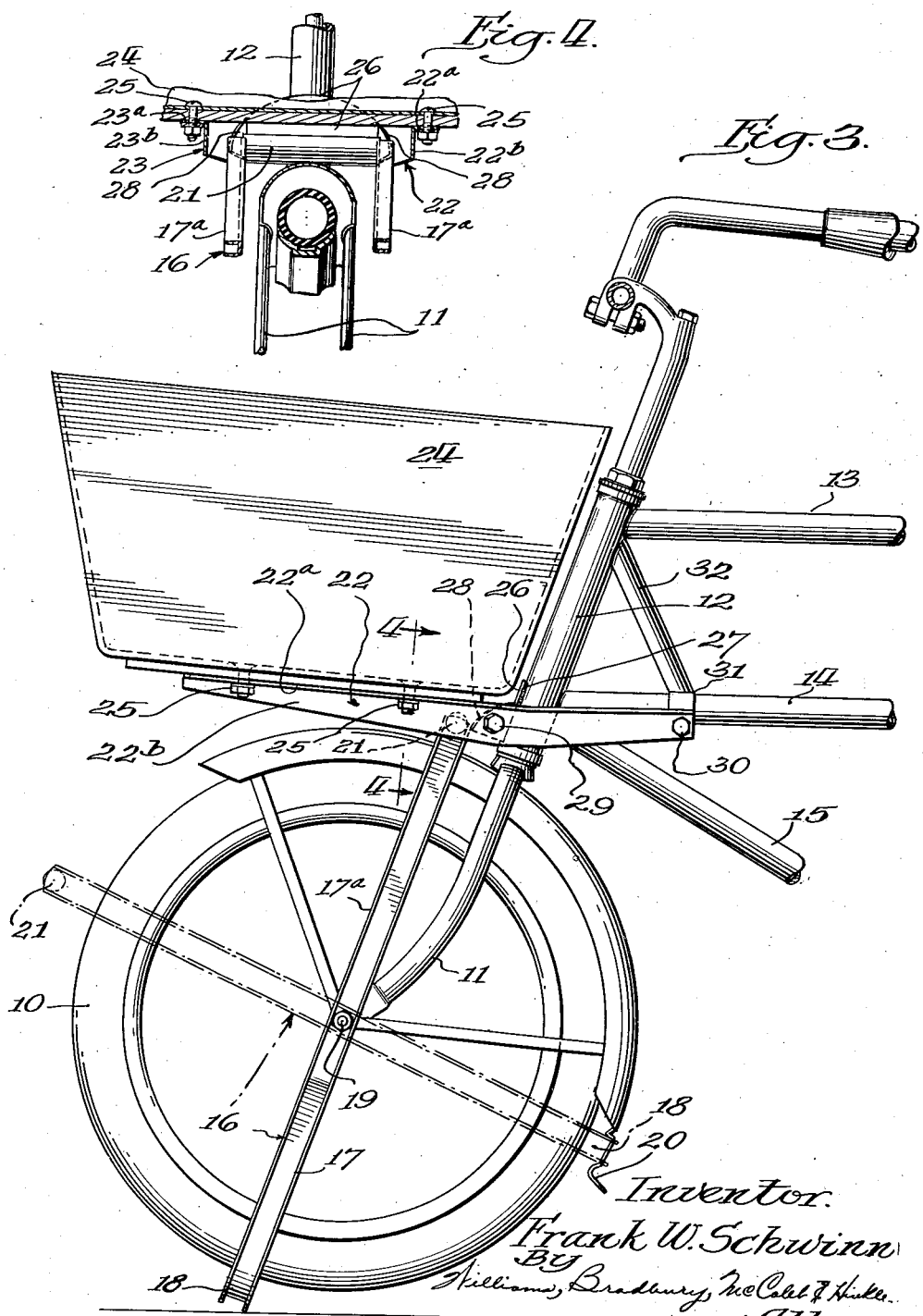

Patented Aug. 5, 1941

2,251,639

UNITED STATES PATENT OFFICE 2,251,639

BICYCLE STAND

Frank W. Schwinn, Chicago, Ill.

Application March 4, 1939, Serial No. 259,742

2 Claims. (Cl. 280—302)

My invention relates to bicycle stands and especially to front wheel stands for bicycles of the type where the stand is pivotally mounted on the axle of the front wheel.

One object of my invention is a front wheel stand of this type in which provision is made for holding the front wheel and its steering fork against turning in the steering head when the stand is in use.

When a front carrier is employed whereby a load is carried fixedly on the frame, it is particularly advisable to use a front wheel stand, and also, because of the position of the load, there is more danger from turning of the steering fork. Because the occasion for a front wheel stand and provision to prevent its turning become more important with the use of a front carrier, a further object of my invention is the convenient incorporation in the front carrier of structure for cooperating with the front wheel stand to prevent turning thereof.

The foregoing together with further objects, features and advantages of my invention are set forth in the following description of specific embodiments thereof and illustrated in the accompanying drawings, wherein:

Fig. 1 is a front elevation of a delivery bicycle incorporating a front carrier and also the front wheel stand of my invention;

Fig. 2 is a plane section of the forward portion of the bicycle taken on the line 2—2 of Fig. 1, portions of the carrier being broken away, and the carrier being shown in its parking position;

Fig. 3 is a view similar to Fig. 1, but showing only the front end of the bicycle and on an enlarged scale and with the stand in its parking position; and Fig. 4 is a transverse vertical section taken on the line 4—4 of Fig. 3;

The carrier and stand phases of the invention herein set forth, are also set forth and claimed in my copending application, Serial No. 259,739, filed March 4, 1939.

The bicycle shown in the drawings is of the delivery type characterized by a relatively small front wheel which gives greater space thereabove for a carrier basket and its contents. In accordance with usual construction, the front wheel 10 is mounted in a steering fork 11, which in turn is more or less vertically journaled in the steering head 12 of the bicycle frame. Upper and lower horizontal frame members 13 and 14 extend rearwardly from the steering head, while the lowermost frame member 15 extends rearwardly and downwardly from the steering head to the pedal crank hanger.

The front wheel stand 16 comprises a strip of channel-shaped cross section bent into a U giving side legs 17 and a broad base 18 forming the web of the U. The legs 17 have suitable holes through which the ends of the front wheel axle 19 extend with nuts therebeyond, whereby the stand is pivotally mounted on the axle. When not in use the stand is swung up toward a horizontal position where the base 18 is retained in the usual fender clip 20.

Instead of terminating substantially at the axle 19, as is customary with front wheel stands, the side legs 17 are extended, as at 17a, so that the side legs extend diametrically across the sides of the wheel. The extension ends of the side legs are interconnected by a tubular cross bar 21 radially beyond the wheel and diametrically opposite the base 18. Thus when the stand is not in use and retained by the clip 20, as in Fig. 1, the cross bar 21 extends forwardly of the wheel, somewhat after the fashion of a bumper.

The cross bar is at such a radius that it not only clears the tire of the wheel, but when the stand is swung down to the parking or racking position of Fig. 3 it extends outside of the fender. As will be seen from Fig. 3, when the stand is to be put into racking service, it is swung clockwise from the idle dotted line position a few degrees past vertical to the full line position. It is there stopped against further clockwise rotation.

A front wheel rack, and especially a front wheel rack in accordance with my invention, is particularly desirable when a frame-carried front carrier is employed in the bicycle. For this reason the structure, which acts as a stop to engage the stand extension and limit its backward movement when in racking position, is, in accordance with my invention, most conveniently incorporated in the structure of the front carrier. Therefore, I shall first describe the front carrier and later point out its structure which thus acts as a stop for the stand extension.

The carrier is framed by right and left beams 22 and 23 disposed in rearwardly converging relation in a horizontal plane, as shown in Fig. 2. These beams are L-shaped in cross section having outwardly directed horizontal flanges 22a and 23a and depending vertical flanges 22b and 23b. A carrier platform box or basket 24 rests on the beams 22 and 23 forwardly of the steering head 12 and may be fixed to the beams by bolts 25 through the platform or bottom of the basket and the horizontal flanges of the beams.

A vertical transversely extending bracket plate 26 is fixed to the forward side of the steering head 12 as by welding 27. The ends of the bracket plate 26 are bent forwardly as ears 28 lying parallel with and against the vertical flanges 22b and 23b of the beams. The ears 28 and the beams are secured together by bolts 29 which extend through the ears and through the vertical flanges 22b and 23b. The plate 26 being fixed, the bolts 29 act as a fulcrum for the beams and carrier generally.

The beams extend rearwardly of this fulcrum for a few inches and at their rearward ends they are anchored by a bolt 30 to a collar 31 fixed on the lower horizontal frame member 14. The carrier load is thus cantilevered forwardly of the bicycle frame by the beams which are fulcrumed at the bolts 29 and rearwardly anchored by the bolt 30. An oblique strut 32 is preferably incorporated in the bicycle frame to extend from the collar 31 to the steering head 12 immediately beneath the upper horizontal frame member 13. This strut 32 better resists the upward thrust on the anchor bolt 30 caused by the carrier load. The compression thrust on the strut 32 also resists the tendency of the upper end of the somewhat oblique steering head 12 to move backwardly under the increased weight on the bicycle frame due to the carrier load. In this way the strut 32 accommodates the increased strain due to the carrier load without the necessity of strengthening the bicycle frame generally.

The carrier cooperates with the stand extension in this way: As the extension is swung upwardly to racking position, the top cross bar 21 swings between the converging vertical flanges 22b and 23b of the beams and by engaging an end of the cross bar or end of the frame extension, as the case may be, they serve to guide the upper end of the extension into a medial position. If the front wheel is not parallel with the plane of the bicycle frame, this engagement with the converging beams will turn the front wheel and fork in the steering head until it is in that position. In this way it is assured that the stand base 18 is at right angles to the plane of the bicycle frame, so that there is the widest effective spread for the two points of the stand base which together with the contact point of the rear wheel constitute the three-point suspension of the bicycle when racked on the stand. The ends of the stand extension leg 17a come to rest when they contact the forward ends of the ears 28. The top cross bar 21 holds the upper ends of the leg extension 17a spaced at a distance which is but a trifle less than the spacing of the vertical flanges 22b and 23b of the beams at the forward ends of the ears 28. This abutment of the stand extension against the ears 28 constitutes a stop limiting further clockwise rotation of the stand and holds the stand at a predetermined angle to the vertical. Counterclockwise rotation of the stand is resisted by the weight of the front end of the bicycle and the carrier load, because counterclockwise rotation would involve an upward movement of that weight about the stand base as an axis.

It will be noted that adjacent the ears 28 the vertical flanges 22b and 23b are relatively deep. They must not, however, be so deep as to interfere with the turning of the fender with the fork in steering the bicycle. Considerable depth to the vertical flanges of the beams is required to insure their engagement by the upper end of the stand extension even though, in passing rearwardly from a vertical position, the upper end of the stand extension comes to a lower elevation in following an arc centered at the wheel axle.

The carrier cooperates with the stand extension not only in presenting an abutment limiting its rearward swing, guiding it to that position, and pulling the wheel into a straight head position, but the carrier also cooperates with the stand extension in preventing a turning of the stand, wheel and fork about the axis of the steering head while the bicycle is in parked position.

If the stand extension had only one limiting abutment in a medial plane, such, for example, as merely abutting the forward face of the steering head 12, the abutment would not prevent turning of the fork and stand. If they turned, the right and left ends of the stand base 18 would come more closely into alignment with the contact point of the rear wheel, so that the effectiveness of the three-point support would be lost and the bicycle would easily fall. This danger would be the greater when there was a load on the carrier which tends to make the bicycle more top heavy.

By my invention this turning of the stand when in parked position is prevented by using two rather widely spaced abutments—the ears 28—for engagement by the upper end of the stand extension. The weight of the front end of the bicycle plus the carrier load is applied as a downward thrust to the stand at the wheel axle, and since this is some distance back from the contact of the stand base 18 with the ground, the upper end of the stand extension is pushed backwardly against the ears 28 with considerable force. Any force tending to turn the steering fork to the left, for example, would tend to swing the cross bar 21 of the stand forwardly about the left-hand ear 28. That in turn would involve a forward movement of the stand extension, and the forward movement of the stand extension would in turn be resisted by the weight of the front end of the bicycle and the carrier load. Thus the greater the carrier load, the greater the force which would resist any tendency to turning of the stand or steering fork.

If the stand, and especially the upper part of the stand, should be twisted out of position (so, for example, that the cross bar or yoke 21 would be out of parallel with the wheel axle) or should the upper part of the frame be deformed so that the cross bar 21 was shifted axially of itself, the stand would still be operable and rest against both its abutments 28, even though, by reason of such deformity or twisting, the front wheel and fork would be slightly turned in racking position. This feature is of great practical benefit because it not only obviates close tolerances in manufacture, but it permits the use of lighter stock for the stand than could be used if it were essential that the stand resist any reasonable permanent distortion.

The carrier supporting beams perform a function in addition to, and quite independent of, their function as guides for the upper end of the stand as it approaches its abutments. The rearward portions of those beams serve as oblique struts whereby a rearward thrust on one of the abutments is not borne wholly by the bracket 26, but in a large measure by the strut-like portion of the adjoining beam 22, which translates the thrust through the collar 31 to the lower horizontal frame member 14 as a rearward longitudinal pull thereon. For this reason the bracket 26, while cut from wide enough sheet stock to give the necessary height for carrying the load at the fulcrum bolts 29, may be made of comparatively thin sheet stock because it does not itself have to resist the rearward strain on its ends which would otherwise tend to bend it.

While I have described and illustrated this specific embodiment of my invention, I contemplate that many changes and substitutions may be made without departing from the scope or spirit of my invention.

I claim:

1. The combination with a bicycle having a frame with a steering head, a front fork journalled in the head, and a front wheel carried by the fork, a stand for the front wheel carried by the fork and pivotally mounted on the bicycle adjacent the axis of the wheel, said stand having a ground engaging base and an extension beyond the pivotal mounting swinging therewith when the stand is swung to racking position, and a pair of converging members carried by the frame, said converging members being considerably wider apart at their forward ends than the width of said extension, adapted to receive said extension between them in racking position, and to engage said extension when the front wheel is turned from straight forward position in racking, thereby to guide the said stand and front wheel so that when the ground engaging base of said stand is in proper racking position the front and rear wheels are aligned.

2. The combination with a bicycle having a frame with a steering head, a front fork journalled in the head, and a front wheel carried by the fork, a stand for the front wheel carried by the fork and pivotally mounted on the bicycle adjacent the axis of the wheel, said stand having a ground engaging base and a generally U-shaped extension swinging over the front wheel when the ground engaging base is brought to racking position, a pair of rearwardly converging members attached to the frame and extending forwardly above the front wheel, said converging members being considerably wider apart at their forward ends than the width of said U-shaped extension which is adapted to be received between them in racking position, said converging members serving to guide said extension when the front wheel is turned from straight forward position in racking, thereby to position such wheel in alignment with the rear wheel when the bicycle is racked, and an abutment between said converging members to limit swinging of the extension of said stand when its ground engaging base is in position for racking the bicycle.

FRANK W. SCHWINN.